United States Patent
Alriksson et al.

(10) Patent No.: US 11,445,498 B2
(45) Date of Patent: Sep. 13, 2022

(54) CONTROL CHANNEL MONITORING

(71) Applicant: Telefonaktiebolaget LM Ericsson (publ), Stockholm (SE)

(72) Inventors: Peter Alriksson, Horby (SE); Tai Do, Lund (SE); Reem Karaki, Aachen (DE); Gen Li, Beijing (CN); Amitav Mukherjee, Elk Grove, CA (US); Yu Yang, Solna (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 101 days.

(21) Appl. No.: 16/631,433

(22) PCT Filed: Jul. 12, 2018

(86) PCT No.: PCT/EP2018/068932
§ 371 (c)(1),
(2) Date: Jan. 15, 2020

(87) PCT Pub. No.: WO2019/029943
PCT Pub. Date: Feb. 14, 2019

(65) Prior Publication Data
US 2020/0187204 A1 Jun. 11, 2020

(30) Foreign Application Priority Data

Aug. 10, 2017 (WO) ................ PCT/CN2017/096792

(51) Int. Cl.
*H04W 72/04* (2009.01)
*H04L 5/00* (2006.01)
(52) U.S. Cl.
CPC ....... *H04W 72/0446* (2013.01); *H04L 5/0007* (2013.01); *H04L 5/0053* (2013.01)

(58) Field of Classification Search
CPC .. H04W 72/0446; H04L 5/007; H04L 5/0053; H04L 5/005; H04L 5/001; Y02D 30/70
See application file for complete search history.

(56) References Cited

U.S. PATENT DOCUMENTS 6,158,041 A * 12/2000 Raleigh ............... H03M 13/256
714/790
2015/0029906 A1* 1/2015 Jana .......................... H04L 5/14
370/278
(Continued)

FOREIGN PATENT DOCUMENTS

CN 102904669 B 5/2016
RU 2573643 C2 1/2016

OTHER PUBLICATIONS

Russian Office Action dated Jun. 25, 2020 in connection with Russian Application No. 2020109732, 6 pages.
(Continued)

*Primary Examiner* — Diane L Lo
*Assistant Examiner* — Abusayeed M Haque
(74) *Attorney, Agent, or Firm* — Leffler Intellectual Property Law, PLLC

(57) ABSTRACT

A method for use in a User Equipment configured to operate according to the New Radio (5G) standard, said method comprising: monitoring a control region for mini-slots for a transmission; detecting a start of the transmission; monitoring a control region of said transmission for regular slots; detecting that the transmission has ended; and in response thereto monitoring the control region for mini-slots again.

8 Claims, 4 Drawing Sheets

(56) References Cited

U.S. PATENT DOCUMENTS

| | | | |
|---|---|---|---|
| 2017/0111886 A1* | 4/2017 | Kim | H04W 48/14 |
| 2017/0332358 A1* | 11/2017 | Park | H04W 72/1289 |
| 2019/0174571 A1* | 6/2019 | Deenoo | H04W 76/11 |
| 2020/0260418 A1* | 8/2020 | Xue | H04L 5/0094 |
| 2021/0028907 A1* | 1/2021 | Matsumura | H04W 72/0406 |
| 2021/0120574 A1* | 4/2021 | Takeda | H04W 72/0493 |

OTHER PUBLICATIONS

English language translation of Russian Office Action dated Jun. 25, 2020 in connection with Russian Application No. 2020109732, 2 pages.

PCT International Search Report, dated Oct. 5, 2018, in connection with International Application No. PCT/EP2018/068932, all pages.

PCT Written Opinion, dated Oct. 5, 2018, in connection with International Application No. PCT/EP2018/068932, all pages.

Guangdong OPPO Mobile Telecom; "DL control channel monitoring granularity configuration"; 3GPP TSG RAN WG1 meeting #89, R1-1707815, Hangzhou, P.R. China, May 15-19, 2017, 3 pages.

Guangdong OPPO Mobile Telecom; "DL control channel design for URLLC"; 3GPP TSG RAN WG1 meeting #89, R1-1707710, Hangzhou, P.R. China, May 15-19, 2017, 4 pages.

Huawei, Hisilicon; "PDCCH monitoring conditional on data scheduling"; 3GPP TSG RAN WG1 meeting #89, R1-1708152, Hangzhou, China, May 15-19, 2017, 4 pages.

Ericsson; "Impact on MAC from PDCCH monitoring occasions"; 3GPP TSG RAN WG2 #98, R2-1704399, Hangzhou, P.R. of China, May 15-19- 2017, 4 pages.

Ericsson; "On DL signals and channels for NR-U"; 3GPP TSG RAN WG1 Meeting #93, R1-1806251, Busan, Korea, May 21-25, 2018, 4 pages.

Ericsson; "Multiple starting and ending positions for LAA DL"; 3GPP TSG RAN WG1 Meeting #88bis, R1-1705450, Spokane, USA, Apr. 3-7, 2017, 5 pages.

Samsung; "MAC impacts from PHY indication for scheduling"; 3GPP TSG RAN WG2 NR #98 Meeting, R2-1704502, Hangzhou, China, May 15-19, 2017, 5 pages.

India Office Action dated Jun. 30, 2021 in connection with India Application No. 202017002687, 7 pages.

Japanese Office Action dated Apr. 13, 2021 in connection with Japanese Application No. 2020-506183, 3 pages.

English language translation of Japanese Office Action dated Apr. 13, 2021 in connection with Japanese Application No. 2020-506183, 3 pages.

3GPP TSG RAN WG1 NR Ad-Hoc#2, R1-1710155, Qingdao, P.R. China Jun. 27-30, 2017, "DL control channel design for URLLC", Guangdong OPPO Mobile Telecom, 4 pages.

* cited by examiner

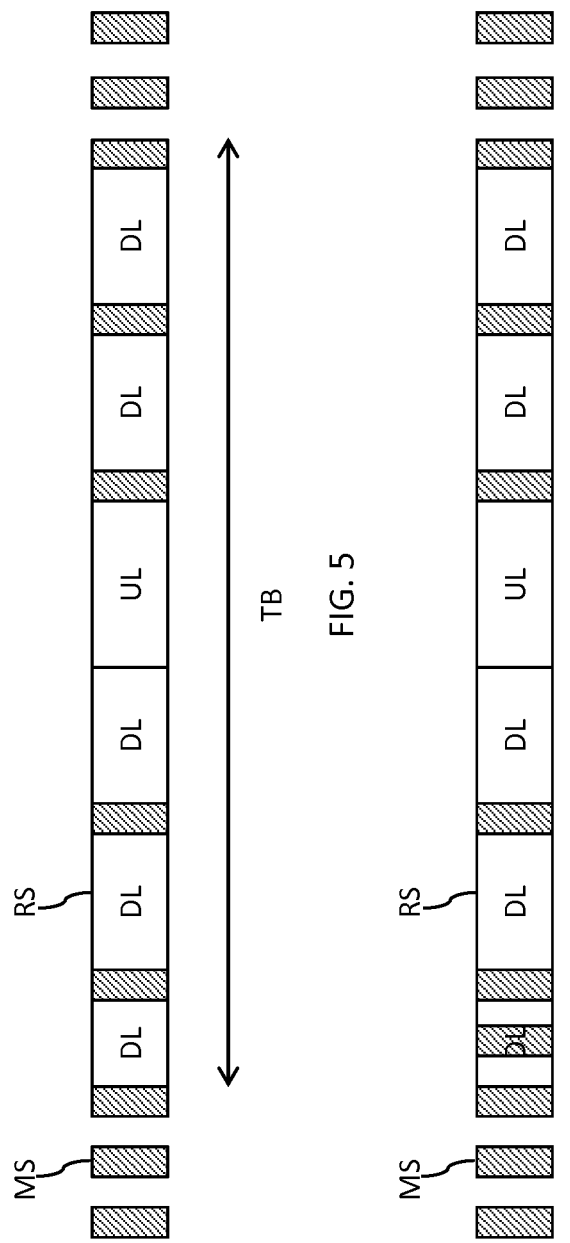

CONTROL CHANNEL MONITORING

TECHNICAL FIELD

This application relates to a telecommunications device, a method and a computer-readable storage medium for improved control channel monitoring and in particular for providing control channel monitoring with a dynamic or non-static periodicity.

BACKGROUND

Currently the 5th generation of cellular system, called New Radio (NR) is being standardized in 3GPP. NR is developed for maximum flexibility to support multiple and substantially different use cases. Besides the typical mobile broadband use case, also machine type communication (MTC), ultra-reliable low latency communications (URLLC), side-link device-to-device (D2D) and several other use cases too.

In NR the basic scheduling unit is called a slot. A slot consists of either 7 or 14 OFDM symbols for the normal cyclic prefix configuration. 7 symbol slots are only available for when the subcarrier-spacing is 60 kHz or lower. As an example a slot with 7 symbols at 60 kHz subcarrier-spacing is 125 us long.

The first OFDM symbol(s) of a slot contains control information for the UE (User Equipment), the so called control region. This control information can for example be downlink assignments or uplink grants.

To reduce latencies a mechanism called mini-slots has been introduced in NR. A mini-slot is, as the name suggests, a slot that has fewer OFDM symbols than a regular slot. Current agreements allow mini-slots of length 2 to 14 OFDM symbols.

Similar to a slot, the first OFDM symbol(s) of a mini-slot contains control information. Thus for a UE to be able to be scheduled using mini-slots, it must monitor the control region of every possible location of the mini-slot. For example, if the mini-slot comprises of two symbols out of one is the control region, the UE needs to monitor the control region every second OFDM symbol.

NR also supports flexible bandwidth configurations for different UEs on the same serving cell. In other words, the bandwidth monitored by a UE and used for its control and data channels may be smaller than the carrier bandwidth. One or multiple bandwidth part configurations for each component carrier can be semi-statically signalled to a UE, where a bandwidth part consists of a group of contiguous PRBs. Reserved resources can be configured within the bandwidth part. The bandwidth of a bandwidth part equals to or is smaller than the maximal bandwidth capability supported by a UE.

The inventors of the inventions to be discussed herein, has, after insightful and inventive reasoning, envisioned and realized that there will be a problem in that to allow a gNB (NR access point or base station) to access the channel using mini-slots, UEs must be configured to monitor the control region with a periodicity that equals the mini-slot length. This is costly in terms of processing resources and power consumption. Once the gNB has gained access to the channel, in many cases scheduling with slot granularity is sufficient. Thus there is a need for a method to switch between the frequent monitoring of the control region of mini-slots and the less frequent monitoring of the control region of the regular slots.

The same problem may exist when a UE accesses a channel during Device to Device (D2D) communication).

In view of the problems and shortcomings indicated above, there is a need for an improved manner of monitoring a control channel that reduces the power consumption and also the consumption of other resources.

SUMMARY

The inventors of the present invention have realized, after inventive and insightful reasoning that there are envisioned problems relating to the mini slots as discussed above.

This invention proposes a method a UE method for switching between monitoring of the control region of mini-slots, e.g. every X=2 OFDM symbols and monitoring of the control region of regular slots, e.g. every X=7 or 14 OFDM symbols. The method is based on that before the UE detects a transmission from the serving gNB it monitors the control region of mini-slots. Once detecting a transmission from the serving gNB (and if configured to do so) it stops monitoring the control region of mini-slots and starts monitoring the control region of regular slots.

It is therefore an object of the teachings of this application to overcome or at least mitigate one or more of the problems and shortcomings listed above and below by providing a method for use in a User Equipment for example being configured to operate according to the New Radio (5G) standard, said method comprising: monitoring a control region for mini-slots for a transmission; detecting a start of the transmission; monitoring a control region of said transmission for regular slots; and monitoring the control region for mini-slots again.

In one embodiment the method further comprises determining a transmission length.

In one embodiment the method further comprises detecting that the transmission has ended; and in response thereto monitor the control region for mini-slots again.

In one embodiment the method further comprises postponing the switch from monitoring the control region of mini-slots to monitoring the control region of regular slots until a slot border.

In one embodiment the method further comprises receiving information regarding if a particular slot (slot or mini-slot) is allocated for downlink or uplink, and in case of uplink allocation, stopping monitoring of the control region for said slot and resuming monitoring in time intervals allocated to downlink transmissions.

In one embodiment the method further comprises adaptation of a bandwidth that is monitored.

It is also an object of the teachings of this application to overcome or at least mitigate one or more of the problems and shortcomings listed above and below by providing a User Equipment for example being configured to operate according to the New Radio (5G) standard and comprising a controller configured to: monitor a control region for mini-slots for a transmission; detect a start of the transmission; monitor a control region of said transmission for regular slots; and monitor the control region for mini-slots again.

It is also an object of the teachings of this application to overcome or at least mitigate one or more of the problems and shortcomings listed above and below by providing a computer readable storage medium encoded with instructions that, when executed on a processor, perform the method according to herein.

By allowing the UE to only monitor the control region of the mini-slots before the gNB has gained access to the channel and then switching to monitoring the control region of regular slots, the UE can both save power and avoid being capable of frequent control region monitoring while receiving data. Where the latter can benefit a simpler UE design and lower cost.

Other features and advantages of the disclosed embodiments will appear from the following detailed disclosure, from the attached dependent claims as well as from the drawings. Generally, all terms used in the claims are to be interpreted according to their ordinary meaning in the technical field, unless explicitly defined otherwise herein. All references to "a/an/the [element, device, component, means, step, etc.]" are to be interpreted openly as referring to at least one instance of the element, device, component, means, step, etc., unless explicitly stated otherwise. The steps of any method disclosed herein do not have to be performed in the exact order disclosed, unless explicitly stated.

BRIEF DESCRIPTION OF DRAWINGS

The invention will be described in further detail under reference to the accompanying drawings, in which:

FIG. 5 shows a schematic time view of a transmission according to one embodiment of the teachings of this application;

FIG. 6 shows a schematic time view of a transmission according to one embodiment of the teachings of this application.

DETAILED DESCRIPTION

The disclosed embodiments will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout.

Figure 1A:
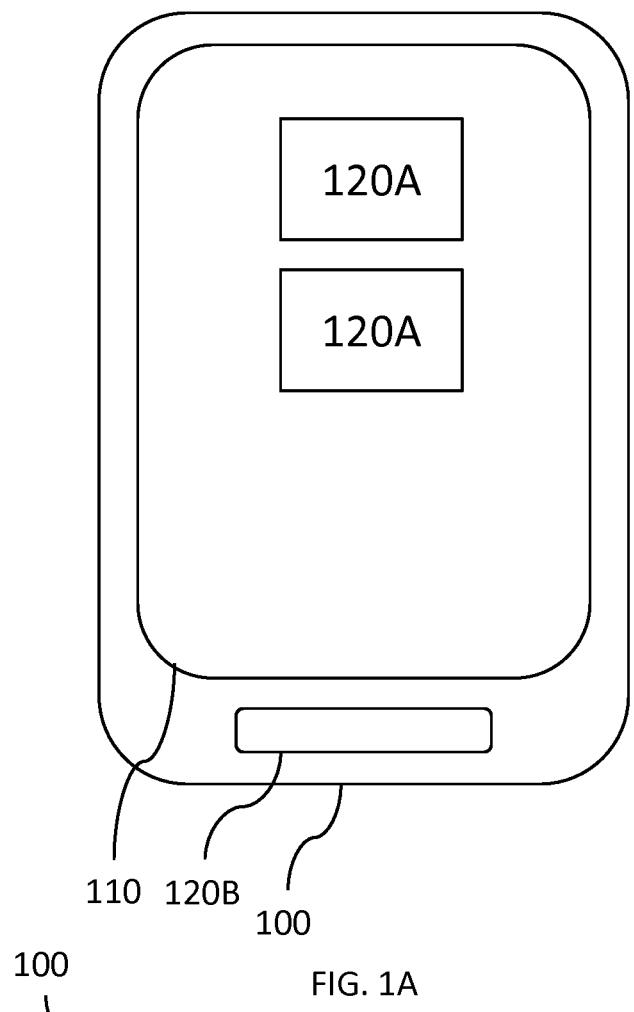
FIG. 1A shows a schematic overview of a UE according to one embodiment of the teachings of this application.

FIG. 1A shows a schematic overview of a telecommunications device or User Equipment (UE) 100 according to one embodiment of the present invention. The UE may be a robotic tool, a smartwatch, a smartphone, an internet tablet, a gaming device, or a (laptop) computer. In the following the UE will be exemplified as being a smartphone 100.

The UE 100 comprises a presentation device 110 being able to output and/or receive data. One example of such a presentation device is a touch display 110.

The touch display 110 a user provides input by touching the display, possibly on a virtual key 120A. Other manners of inputting data is through physical keys 120B. IN the example of FIG. 1A, the UE 100 has two virtual keys 120A and one physical key 120B, however, as would be understood, any number, shape and arrangement of keys depends on the design of the UE, and also the current execution context of the UE.

The UE 100 may also be arranged to receive and/or output haptic data, such as through a haptic presentation device 110, possibly being incorporated in the touch display 110.

Figure 1B:
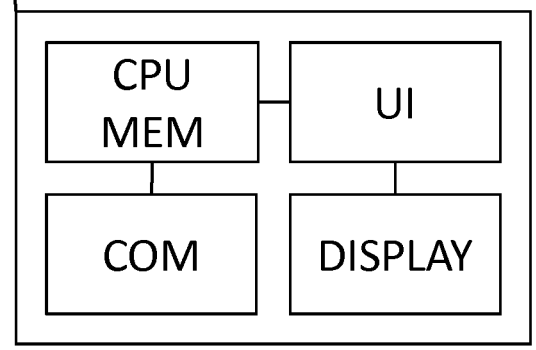
FIG. 1B shows a schematic overview of the components of a UE according to one embodiment of the teachings of this application.

FIG. 1B shows a schematic view of the components of a UE 100. A controller CPU is configured to control the overall and also specific functions of the UE 100 such as by executing computer program instructions loaded into or stored on a memory connected or being part of the controller. The controller may comprise one or more processors or other logic programmable circuits for combined or individual execution of a task or application. However, for the purpose of this application they will be seen as being the one and same controller CPU. The controller CPU is connected to a memory MEM for storing computer instructions and also data to be processed by the computer instructions when executed by the controller CPU. The memory may comprise one or several memory circuits, possibly arranged in a hierarchy. One or more of such memory circuits may be comprised in the controller CPU. For the purpose of this application the memory circuits will be regarded as one memory MEM.

The controller CPU is also connected to a user interface UI for receiving input from a user and for presenting data or other information to the user. As discussed above, a display may be comprised in the user interface UI.

The controller is also connected to a communications interface COM, such as a Radio frequency interface. The RF interface may be configured to operate according to a long range standard, such as a cellular network standard, for example a 5G standard. The RF interface may alternatively or additionally be configured to operate according to a short range standard, such as a Bluetooth®, IEEE802.11b (WiFi™), IEEEE802.16, ZigBee™ or NFC™ (Near Field Communication) standard, for example a 5G standard.

The communications interface COM enables a first UE 100 to communicate with a second UE (referenced 100A and 100B in FIG. 2 and as will be discussed in greater detail with reference to FIG. 2) for receiving and/or transmitting visual and haptic data.

Figure 2:
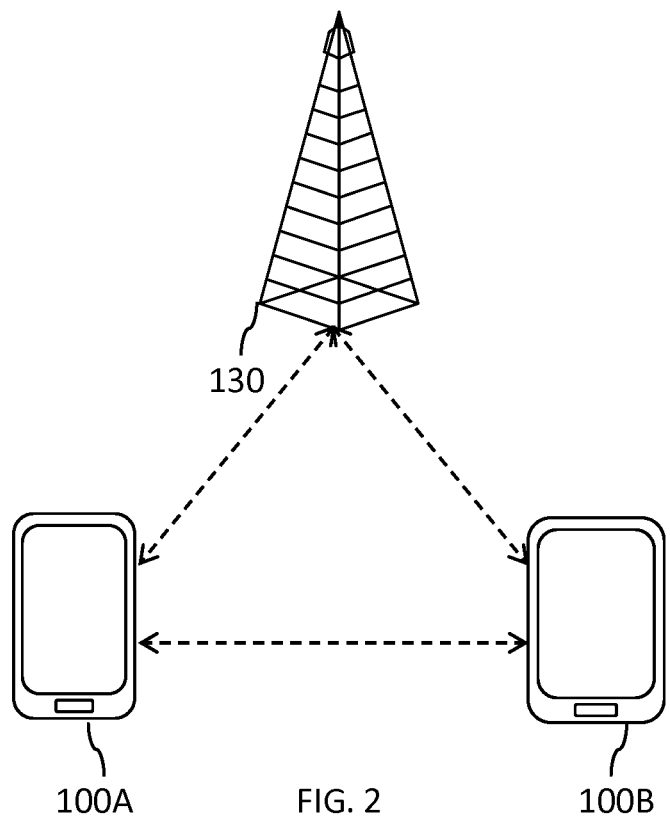
FIG. 2 shows a schematic view of an example UE system according to one embodiment of the teachings of this application.

FIG. 2 shows a communication system arranged to operate according to the 5G standard, in which a first UE 100A is communicating (as indicated by the dashed arrows) with a second UE 100B. In one embodiment, the communication is effected through a base station gNB130. In one embodiment, the communication is effected between the UEs in so-called Device-to-Device (D2D) communication, which is also supported by the 5G-standard.

Figure 3:
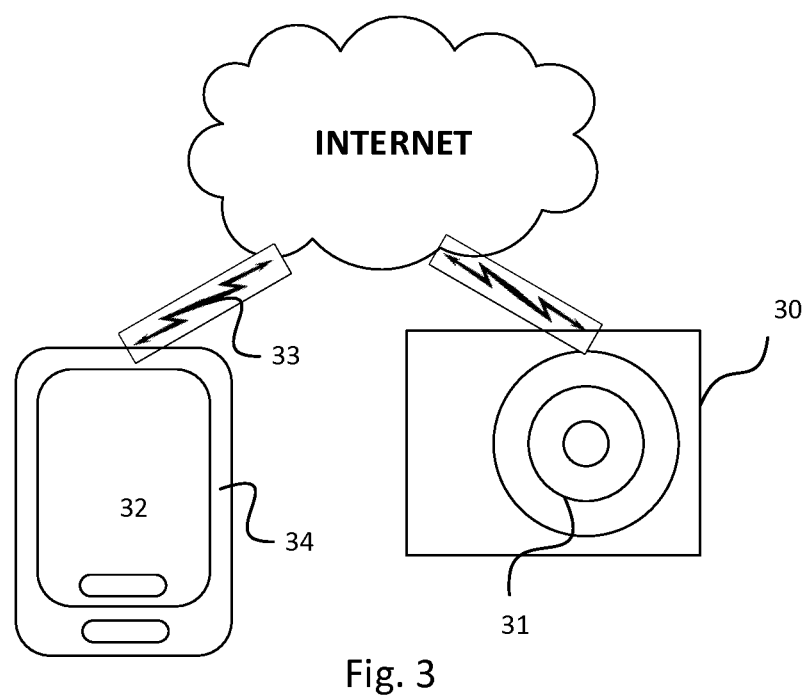
FIG. 3 shows a schematic view of a computer-readable medium according to the teachings herein.

FIG. 3 shows a schematic view of a computer-readable medium as described in the above. The computer-readable medium 30 is in this embodiment a data disc 30. In one embodiment the data disc 30 is a magnetic data storage disc. The data disc 30 is configured to carry instructions 31 that when loaded into a controller, such as a processor, executes a method or procedure according to the embodiments disclosed above. The data disc 30 is arranged to be connected to or within and read by a reading device 32, for loading the instructions into the controller. One such example of a reading device 32 in combination with one (or several) data disc(s) 30 is a hard drive. It should be noted that the computer-readable medium can also be other mediums such as compact discs, digital video discs, flash memories or other memory technologies commonly used.

The instructions 31 may also be downloaded to a computer data reading device 34, such as a smartphone or other device capable of reading computer coded data on a computer-readable medium, by comprising the instructions 31 in a computer-readable signal 33 which is transmitted via a wireless (or wired) interface (for example via the Internet) to the computer data reading device 34 for loading the instructions 31 into a controller. In such an embodiment the computer-readable signal 33 is one type of a transient computer-readable medium 30.

The instructions may be stored in a memory (not shown explicitly in FIG. 3, but referenced MEM in FIG. 1B) of the smartphone 34. The smartphone of FIG. 3 possibly being a smartphone as in FIGS. 1A and 1B. The instructions comprising the teachings according to the present invention may thus be downloaded or otherwise loaded in to a UE 100 in order to cause the UE 100 to operate according to the teachings of the present invention.

References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

Figure 4:
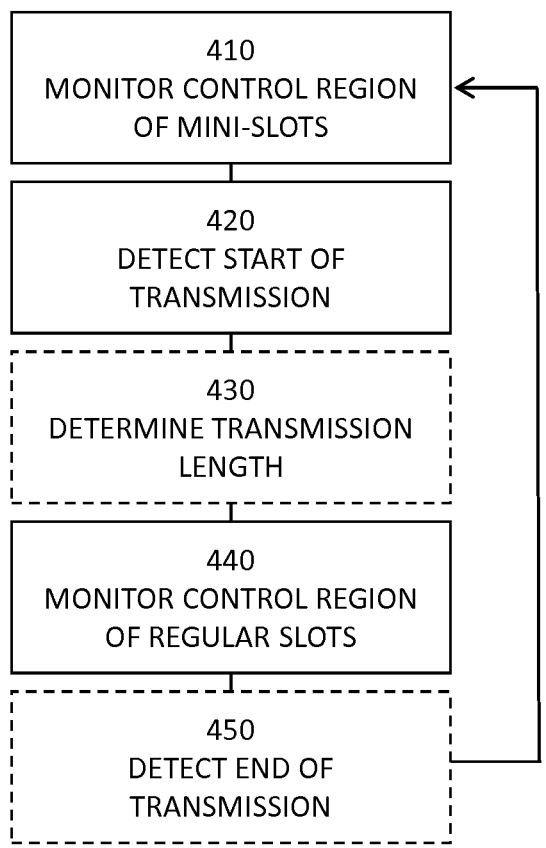
FIG. 4 shows a flowchart for a general method of controlling a telecommunications device according to the teachings herein.

The invention will now be described based on the flowchart in FIG. 4 showing a flowchart for a general method according to herein.

Before detecting any transmission burst (TB in FIGS. 5 and 6), such as from the gNB, the UE 100 monitors 410 the control region of mini-slots (MS in FIGS. 5 and 6). The transmission detection can be done e.g. by correlation to a known reference signal or preamble such as e.g. DMRS (Demodulation Reference Signal), CSI-RS (Channel State Information-Reference Signals), PSS, or SSS (Primary or Secondary Synchronization Signals) or by decoding a common channel, e.g. C-PDCCH (common physical downlink control channel) or PBCH (physical broadcast channel). The periodicity at which the control region of mini-slots occur is given to the UE 100 as part of higher layer signaling, for example RRC signaling, either dedicated or broadcast. In one embodiment, it is during every $2^{nd}$ OFDM slot. The transmission may also be from a second UE 100 if D2D communication is used. The examples herein will, however, focus on the transmission from a gNB.

Upon detection 420 of a transmission from the gNB, the UE 100 optionally determines 430 the length of the transmission burst from the gNB. The transmission detection can be done e.g. by correlation to a known reference signal or preamble such as e.g. DMRS (Demodulation Reference Signal), CSI-RS (Channel State Information-Reference Signals), PSS, or SSS (Primary or Secondary Synchronization Signals) or by decoding a common channel, e.g. C-PDCCH (common physical downlink control channel) or PBCH (physical broadcast channel).

The transmission burst length determining 430 (which is optional) can be done by reading explicit control information transmitted by the gNB on e.g. C-PDCCH or it can be done by repeated transmission detection as outlined above.

During the transmission burst, the UE 100 switches to monitoring 440 the control region of regular slots (RS in FIGS. 5 and 6) instead of mini-slots, if configured to do so. The configuration can include an offset (relative the start of the transmission burst) at which the switch from mini-slots to regular sized slots occur. The offset could be determined by the time point of LBT (Listen Before Talk) success, scheduling situation, data processing (encode and modulate) delay to mention a few examples. The periodicity of the monitoring has thus changed.

In one embodiment the UE is configured to monitor the control channel with a periodicity of once every $7^{th}$ OFDM symbol when monitoring for regular slots.

In one embodiment in FIG. 5, the first scheduled mini-slot is longer than the unscheduled mini-slots prior to the start of the transmission burst. The length of this longer mini-slot can be signaled dynamically using a common control channel, e.g. C-PDCCH. Note that the use of a common control channel conveys this information to all UE 100s, not only the ones scheduled in the mini-slot. Another option is that it can be signaled through higher layer signaling, e.g. RRC signaling, that the first scheduled mini-slot of all transmission burst s extends to the next slot border. This approach uses less overhead in terms of control region, but it requires more involved signaling and/or configurations. To avoid re-encoding the data, simple aggregation of each mini-slot data block could be adopted by maintaining the same code rate. FIG. 5 thus shows one example of how the UE switches between control region monitoring for mini-slots and regular slots. In this embodiment the first scheduled mini-slot is longer than the minimum length of the unscheduled mini-slots prior to the start of the transmission burst. In this embodiment the UE is configured to monitor the control region for mini-slots, every two OFDM symbols for example. And, as the UE detects a transmission, the UE then reads C-PDCCH and determines the length of the first scheduled mini-slot. Alternatively it may be configured through RRC that the length of the first scheduled mini-slot extends to the slot border.

The UE then starts monitoring the control region on the first OFDM symbol in every slot. However, the UE may be configured to skip monitoring the control region in the slot it knows is an UL slot. This can be determined by reading C-PDCCH in the previous slot. Alternatively it may be stipulate by a fixed pattern through RRC signaling.

If the UE skips monitoring for an UL slot, the UE resumes monitoring the control region on the first OFDM symbol in every slot after the UL slot.

As the UE determines that the transmission burst has ended, the UE resumes monitoring of the control region of mini-slots. In one embodiment, the UE determines that the transmission burst has ended by detecting that the transmission has ended using transmission detection techniques. In one embodiment, the UE determines that the transmission burst has ended by reading the length of the transmission burst in C-PDCCH. In one embodiment, the UE determines that the transmission burst has ended by using a maximum transmission burst length.

In one embodiment as seen in FIG. 6, the length of the mini-slots does not change and the UE 100 postpones the switch from monitoring the control region of mini-slots to regular slots until the slot border, or, if configured with an offset, to after the slot border. This approach uses more overhead in terms of control region, but requires less involved signaling and/or configurations. FIG. 6 thus shows another example of how the UE switches between control region monitoring for mini-slots and regular slots. In this embodiment the scheduled mini-slots have the same length as the minimum length of the unscheduled mini-slots prior to the start of the transmission burst. In this embodiment the UE is configured to monitor the control region for mini-slots, every two OFDM symbols for example. And, as the UE detects a transmission, the UE continues to monitor the control region of mini-slots until the next slot border. As a slot border has passed, the UE starts monitoring the control region on the first OFDM symbol in every slot.

However, the UE may be configured to skip monitoring the control region in the slot it knows is an UL slot. This can be determined by reading C-PDCCH in the previous slot. Alternatively it may be stipulate by a fixed pattern through RRC signaling.

If the UE skips monitoring for an UL slot, the UE resumes monitoring the control region on the first OFDM symbol in every slot after the UL slot.

As the UE determines that the transmission burst has ended, the UE resumes monitoring of the control region of mini-slots. In one embodiment, the UE determines that the transmission burst has ended by detecting that the transmission has ended using transmission detection techniques. In one embodiment, the UE determines that the transmission burst has ended by reading the length of the transmission burst in C-PDCCH. In one embodiment, the UE determines that the transmission burst has ended by using a maximum transmission burst length.

In addition, the UE 100 may take or receive information (e.g. transmitted on C-PDCCH) regarding if a particular time interval (slot or mini-slot) is allocated for downlink or uplink. In case of uplink allocation, the UE 100 stops monitoring of the control region for said interval. It then resumes monitoring in time intervals allocated to downlink transmissions.

Once the gNB transmission burst ends, the UE 100 switches back to monitoring the control region of mini-slots. This can either be determined based on the optionally determined transmission burst length or detected using known reference signals as outlined above. The procedure then repeats for the next transmission burst.

In one aspect of the above embodiments, the switching between monitoring of slot and mini-slot control regions is augmented with adaptation of the bandwidth that is monitored in the respective cases. Using higher-layer signaling, a first bandwidth part is configured when the UE 100 is monitoring the control region of mini-slots. After detecting the start of gNB transmission, the UE 100 can be configured to switch to a second bandwidth part when monitoring the slot control region. As a non-limiting example, the second bandwidth part is larger than said first bandwidth part.

In another aspect of the above embodiments, the gNB configuration, used for configuring the UE, also enables or disables monitoring of certain DCI (Downlink Control Information) formats for the respective cases of mini-slot and slot control regions. For example, monitoring of certain DCI formats may be disabled for the mini-slot control region when there is no gNB DL activity, in order to reduce PDCCH decoding complexity. Utilizing the teachings herein, a UE will be able to detect and decode DCI faster and while reserving resources.

Figure 7:
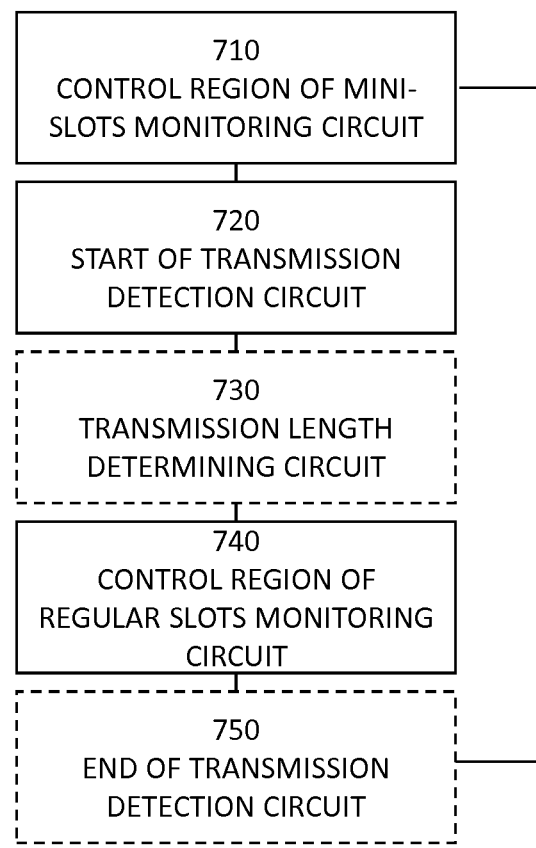
FIG. 7 shows a schematic view of a circuit arrangement for handling a transmission according to one embodiment of the teachings of this application.

The invention will now be described based on the circuit overview of FIG. 7. Before detecting any transmission burst (TB in FIGS. 5 and 6), such as from the gNB, the UE 100 comprises a circuit 710 for monitoring the control region of mini-slots (MS in FIGS. 5 and 6). The transmission detection can be done e.g. by correlation to a known reference signal or preamble such as e.g. DMRS (Demodulation Reference Signal), CSI-RS (Channel State Information-Reference Signals), PSS, or SSS (Primary or Secondary Synchronization Signals) or by decoding a common channel, e.g. C-PDCCH (common physical downlink control channel) or PBCH (physical broadcast channel). The periodicity at which the control region of mini-slots occur is given to the UE 100 as part of higher layer signaling, for example RRC signaling, either dedicated or broadcast. In one embodiment, it is during every $2^{nd}$ OFDM slot. The transmission may also be from a second UE 100 if D2D communication is used. The examples herein will, however, focus on the transmission from a gNB.

For detection of a transmission from the gNB, the UE 100 comprises a circuit 720 for detection of a transmission. The UE may also optionally comprises a circuit 730 for determining the length of the transmission burst from the gNB. As stated above, the transmission detection can be done e.g. by correlation to a known reference signal or preamble such as e.g. DMRS (Demodulation Reference Signal), CSI-RS (Channel State Information-Reference Signals), PSS, or SSS (Primary or Secondary Synchronization Signals) or by decoding a common channel, e.g. C-PDCCH (common physical downlink control channel) or PBCH (physical broadcast channel).

The transmission burst length determining (which is optional) can be done by reading explicit control information transmitted by the gNB on e.g. C-PDCCH or it can be done by repeated transmission detection as outlined above.

The UE also comprises a circuit 740 for monitoring control regions of regular slots so that during the transmission burst, the UE 100 may switch to monitoring the control region of regular slots (RS in FIGS. 5 and 6) instead of mini-slots, if configured to do so. The configuration can include an offset (relative the start of the transmission burst) at which the switch from mini-slots to regular sized slots occur. The offset could be determined by the time point of LBT (Listen Before Talk) success, scheduling situation, data processing (encode and modulate) delay to mention a few examples. The periodicity of the monitoring has thus changed.

In one embodiment the UE is configured to monitor the control channel with a periodicity of once every $7^{th}$ OFDM symbol when monitoring for regular slots.

The UE also comprises a circuit 750 for detecting end of a transmission, upon which the circuit for monitoring mini slots 710 is again activated.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method for use in a User Equipment, said method comprising:
    switching between monitoring a control region of mini-slots and monitoring a control region of regular slots, wherein each of the mini-slots has a shorter duration than each of the regular slots, wherein said switching comprises:
    monitoring the control region of mini-slots;
    detecting a start of a transmission by a network node or another device, where said detecting is by correlation to a known reference signal or preamble, or by decoding a physical control channel or physical broadcast channel;
    during a time when said transmission is ongoing, switching from monitoring the control region of mini-slots to monitoring the control region of regular slots;
    detecting that the transmission has ended and in response thereto, switching from monitoring the control region of regular slots to monitoring the control region of mini-slots again.

2. The method of claim 1, further comprising postponing the switch from monitoring the control region of mini-slots to monitoring the control region of regular slots until a slot border.

3. The method of claim 1, further comprising receiving information regarding whether a particular slot mini-slot is allocated for downlink or uplink, and in case of uplink allocation, stopping monitoring of the control region for said slot and resuming monitoring in time intervals allocated to downlink transmissions.

4. The method of claim 1, further comprising adaptation of a bandwidth that is monitored.

5. The method of claim 1, wherein the User Equipment is configured to operate according to the New Radio (5G) standard.

6. A non-transitory computer readable storage medium encoded with instructions that, when executed on a processor, perform a method for use in a User Equipment, said method comprising:
    switching between monitoring a control region of mini-slots and monitoring a control region of regular slots, wherein each of the mini-slots has a shorter duration than each of the regular slots, wherein said switching comprises:
    monitoring the control region of mini-slots;
    detecting a start of a transmission by a network node or another device, where said detecting is by correlation to a known reference signal or preamble, or by decoding a physical control channel or physical broadcast channel;
    during a time when said transmission is ongoing, switching from monitoring the control region of mini-slots to monitoring the control region of regular slots;
    detecting that the transmission has ended and in response thereto,
    switching from monitoring the control region of regular slots to monitoring the control region of mini-slots again.

7. A User Equipment comprising a controller configured to:
    switch between monitoring a control region of mini-slots and monitoring a control region of regular slots, wherein each of the mini-slots has a shorter duration than each of the regular slots, wherein said switching comprises:
    monitoring the control region of mini-slots;
    detecting a start of a transmission by a network node or another device, where said detecting is by correlation to a known reference signal or preamble, or by decoding a physical control channel or physical broadcast channel;
    during a time when said transmission is ongoing, switching from monitoring the control region of mini-slots to monitoring the control region of regular slots;
    detecting that the transmission has ended and in response thereto,
    switching from monitoring the control region of regular slots to monitoring the control region of mini-slots again.

8. The User Equipment of claim 7, being further configured to operate according to the New Radio (5G) standard.

* * * * *